(12) United States Patent
Lee

(10) Patent No.: US 8,638,507 B2
(45) Date of Patent: Jan. 28, 2014

(54) FISHEYE LENS SYSTEM AND PHOTOGRAPHING APPARATUS

(75) Inventor: Si-nae Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/289,495

(22) Filed: Nov. 4, 2011

(65) Prior Publication Data

US 2012/0113532 A1   May 10, 2012

(30) Foreign Application Priority Data

Nov. 4, 2010   (KR) .................. 10-2010-0109256

(51) Int. Cl.
  *G02B 9/04*   (2006.01)
  *G02B 13/04*   (2006.01)
  *H04N 5/225*   (2006.01)

(52) U.S. Cl.
  USPC ..................... 359/793; 359/749; 348/340

(58) Field of Classification Search
  CPC ............ G02B 9/04; G02B 13/04; G02B 13/16
  USPC .......... 348/143, 340; 359/749, 750, 751, 752, 359/753, 793
  See application file for complete search history.

(56) References Cited

U.S. PATENT DOCUMENTS 7,283,312 B2 *  10/2007  Kawada .................. 359/725
7,317,581 B2 *   1/2008  Ito et al. ................. 359/681

FOREIGN PATENT DOCUMENTS

JP   2007-94371 A   4/2007
JP   2007-164079 A  6/2007

* cited by examiner

*Primary Examiner* — David N Spector
(74) *Attorney, Agent, or Firm* — Sughrue Mion, PLLC

(57) ABSTRACT

A fisheye lens system and a photographing apparatus including the fisheye lens system. The fisheye lens system includes, in an order from an object to an image, a first lens group including at least three lenses and having negative refractive power; and a second lens group having positive refractive power, wherein the at least three lenses included in the first lens group include a first lens, a second lens, and a third lens, in the order from the object to the image.

18 Claims, 10 Drawing Sheets

FISHEYE LENS SYSTEM AND PHOTOGRAPHING APPARATUS

CROSS-REFERENCE TO RELATED PATENT APPLICATION

This application claims priority from Korean Patent Application No. 10-2010-0109256, filed on Nov. 4, 2010, in the Korean Intellectual Property Office, the disclosure of which is incorporated herein in its entirety by reference.

BACKGROUND

1. Field

Apparatuses consistent with exemplary embodiments relate to a fisheye lens system and a photographing apparatus including the fisheye lens system.

2. Description of the Related Art

A fisheye lens system is a lens system that has a viewing angle of 180 degrees or greater, and intentionally generates distortion to photograph an object. A general lens system uses a projection manner of $Y=f \times \tan \theta$. However, in order to ensure a viewing angle of 180 degrees, a fisheye lens system cannot use the same projection manner as that of a general lens system.

In general, a fisheye lens system uses any of four projection manners, that is, $Y=f \times \theta$, $Y=f \times \sin \theta$, $Y=f \times \sin(\theta/2)$, or $Y=f \times \tan(\theta/2)$. In this case, Y is a height of an image indicating a radius of an image circle, f is a focal length, and $\theta$ is a half viewing angle.

SUMMARY

Exemplary embodiments provide a miniaturized fisheye lens system and a photographing apparatus including the miniaturized fisheye lens system.

According to an aspect of an exemplary embodiment, there is provided a fisheye lens system including, in an order from an object to an image: a first lens group including at least three lenses and having negative refractive power; and a second lens group having positive refractive power, wherein the at least three lenses included in the first lens group include a first lens, a second lens, and a third lens, in the order from the object to the image, and satisfy conditions below:

$$0.4 < SF1 < 0.6;$$

$$0.5 < SF2 < 1.0; \text{ and}$$

$$1.3 < SF3 < 5.5,$$

wherein $SFi=(R1i-R2i)/(R1i+R2i)$ is a shaping factor of an ith lens (i=1, 2, or 3), $R1i$ is a radius of curvature of a surface of an object side of the ith lens, and $R2i$ is a radius of curvature of a surface of an image side of the $i^{th}$ lens.

An interval D between the first lens group and the second lens group may satisfy a condition below:

$$3.0 < D/f < 4.0,$$

wherein f denotes an overall focal length of the fisheye lens system.

An interval D between the first lens group and the second lens group may satisfy a condition below:

$$0.3 < D/Ds < 0.5,$$

wherein Ds denotes a length between a lens surface that is closest to the object and a lens surface that is close to the image in the fisheye lens system.

The first lens may satisfy a condition below:

$$1.3 < H1/2Y < 1.5,$$

wherein H1 denotes an effective radius of the surface of the object side of the first lens and 2Y denotes a diameter of an image circle.

The first lens may satisfy a condition below:

$$-0.4 < f/f1 < -0.2,$$

wherein f denotes an overall focal length, and f1 denotes a focal length of the first lens group.

Each of the first lens, the second lens, and the third lens may have negative refractive power.

Each of the first lens and the second lens may be a meniscus lens having a surface convex toward the object.

The first lens group may further include a fourth lens having positive refractive power.

The fisheye lens system may further include an aperture disposed between the first lens group and the second lens group.

The second lens group may include four lenses.

The second lens group may include a positive lens, a positive lens, a negative lens, and a positive lens.

The second lens group may include an aspheric lens.

The second lens group may include a cemented lens.

According to an aspect of another exemplary embodiment, there is provided a photographing apparatus including the fisheye lens system; and an imaging sensor for converting light formed by the fisheye lens system into an electrical image signal.

BRIEF DESCRIPTION OF THE DRAWINGS

The above and other aspects will become more apparent by describing in detail exemplary embodiments thereof with reference to the attached drawings, in which.

DETAILED DESCRIPTION OF EXEMPLARY EMBODIMENTS

Hereinafter, the inventive concept will be described more fully with reference to the accompanying drawings, in which exemplary embodiments of the invention are shown. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those skilled in the art. Unless defined otherwise, technical and scientific terms used herein have the same meaning as is commonly understood by one of skill in the art to which this inventive concept belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and are used only to classify one element from another.

Figure 1:
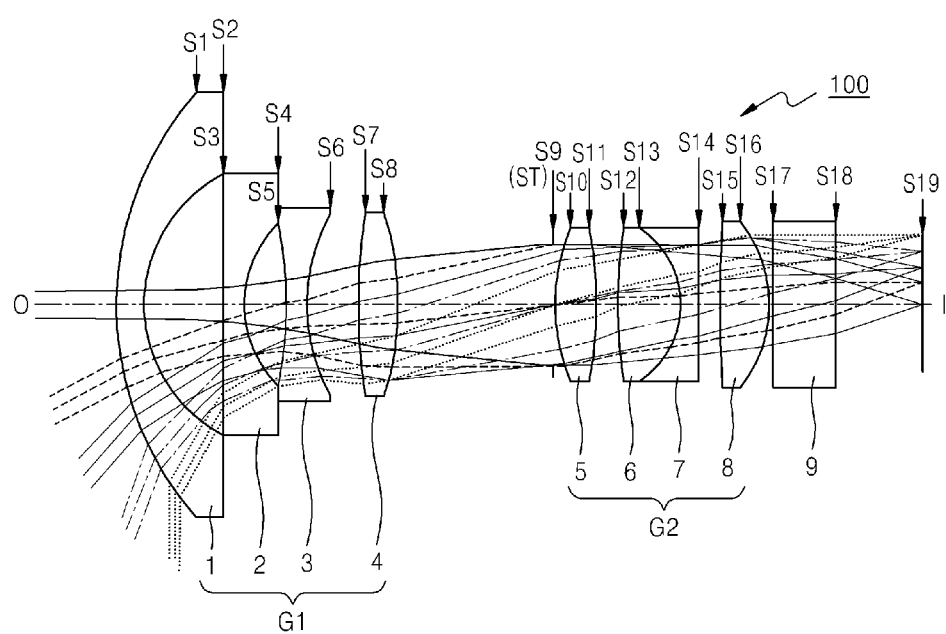
FIG. 1 is a diagram of a fisheye lens system according to an exemplary embodiment.

FIG. 1 is a diagram of a fisheye lens system 100 according to an exemplary embodiment.

Referring to FIG. 1, the fisheye lens system 100 uses a projection manner of Y=f×θ and includes a first lens group G1, an aperture ST, and a second lens group G2 in an order from an object O to an image I.

The first lens group G1 has negative refractive power. The first lens group G1 may include four lenses, i.e., a first lens 1, a second lens 2, a third lens 3, and a fourth lens 4. The first lens 1, the second lens 2, and the third lens 3 may each be a negative lens. The fourth lens 4 may be a positive lens. The first lens 1 and the second lens 2 may each be, for example, a meniscus lens having a surface convex toward the object O. The third lens 3 may be a bi-concave lens.

The second lens group G2 has positive refractive power. The second lens group G2 may include four lenses, i.e., a fifth lens 5, a sixth lens 6, a seventh lens 7, and an eighth lens 8. The second lens group G2 may include an aspheric lens. For example, the aspheric lens may be a lens closest to the image I. Although the fisheye lens system 100 includes only a relatively small number of lenses, the fisheye lens system 100 may have high performance by using the aspheric lens. The second lens group G2 may include a cemented lens.

For example, the fifth lens 5 may be a positive lens. The sixth lens 6 and the seventh lens 7 may be combined to each other. For example, the sixth lens 6 that has positive refractive power and the seventh lens 7 that has negative refractive power may be combined to form the cemented lens. The eighth lens 8 may be an aspheric lens having positive refractive power.

The aperture ST may be disposed between the first lens group G1 and the second lens group G2. A reference numeral 9 denotes an optical filter. The fisheye lens system 100 may satisfy the following conditions.

The first lens 1, the second lens 2, and the third lens 3 of the first lens group G1 may satisfy conditions 1, 2, and 3, respectively.

$$0.4 < SF1 < 0.6 \quad (1)$$

$$0.5 < SF2 < 1.0 \quad (2)$$

$$1.3 < SF3 < 5.5 \quad (3)$$

Here, $SFi=(R1i-R2i)/(R1i+R2i)$ is a shaping factor of an $i^{th}$ lens (i=1, 2, 3), $R1i$ is a radius of curvature of a surface of an object side of the $i^{th}$ lens, and $R2i$ is a radius of curvature of a surface of an image side of the $i^{th}$ lens. Referring to conditions 1 through 3, the first lens 1, the second lens 2, and the third lens 3 have similar shaping factors.

With regard to the fisheye lens system 100, it is important not to reduce a peripheral resolution while maintaining appropriate power of each of the lenses of the fisheye lens system 100. When the three lenses, i.e., the first lens 1, the second lens 2, and the third lens 3, which satisfy conditions 1, 2, and 3, respectively, are used, since the power of each of the first lens 1, the second lens 2, and the third lens 3 does not have to be great, it is easy to compensate for aberration.

Conditions 1 through 3 are simultaneously applied. When each of the shaping factors SFis of conditions 1 through 3 is greater than an upper limit, it is difficult to obtain a wide viewing angle. If each of the shaping factors SFis of conditions 1 through 3 is lower than a lower limit, it is difficult to ensure a proper peripheral resolution.

The first lens group G1 may satisfy condition 4 below.

$$3.0 < D/f < 4.0 \quad (4)$$

In condition 4, D denotes an interval between the first lens group G1 and the second lens group G2, that is, an interval between a center of the first lens group G1 and a center of the second lens group G2. In addition, f denotes an overall focal length of the fisheye lens system 100.

Condition 4 defines a ratio of the interval between the first lens group G1 and the second lens group G2 to the overall focal length of the fisheye lens system 100. If the ratio is greater than an upper limit, it is difficult to compensate for lateral chromatic aberration. If the ratio is lower than a lower limit, it is difficult to compensate for astigmatism and coma.

The interval between the first lens group G1 and the second lens group G2 may satisfy condition 5 below.

$$0.3 < D/Ds < 0.5 \quad (5)$$

In condition 5, D denotes the interval between the first lens group G1 and the second lens group G2, that is, the interval between the center of the first lens group G1 and the center of the second lens group G2. In addition, Ds denotes a length between a lens surface that is closest to the object O and a lens surface that is close to the image I, in the fisheye lens system 100.

Condition 5 defines a ratio of the interval between the first lens group G1 and the second lens group G2 to the interval between the lens surface that is closest to the object O and the lens surface that is closest to the image I. If the ratio is greater than an upper limit, it is difficult to miniaturize the fisheye lens system 100. If the ratio is lower than a lower limit, it is impossible to compensate for a curvature of image field due to a wide viewing angle. That is, in the fisheye lens system 100, if the interval between the first lens group G1 and the second lens group G2 is the largest from among intervals between the lenses included in the fisheye lens system 100, the curvature of image field due to a wide viewing angle may be compensated for. In order to miniaturize the fisheye lens system 100, the intervals between the other lenses may be reduced. When the interval between the first lens group G1 and the second lens group G2 is the largest from among the intervals between the lenses included in the fisheye lens system 100, miniaturization and high performance may be simultaneously satisfied.

The first lens 1 of the first lens group G1 may satisfy Condition 6 below.

$$1.3 < H1/2Y < 1.5 \quad (6)$$

In condition 6, H1 denotes an effective radius of a surface of the object side of the first lens 1, and 2Y denotes a diameter of an image circle that is formed on an image surface in the fisheye lens system 100.

Condition 6 defines a ratio of the effective radius of the surface of the object side of the first lens 1 to the diameter of the image circle. If the ratio is greater than an upper limit, it is impossible to miniaturize the fisheye lens system 100. If the ratio is lower than a lower limit, it is difficult to obtain a viewing angle of 180° or more.

The first lens group G1 may satisfy condition 7 below.

$$-0.4 < f/f1 < -0.2 \quad (7)$$

In condition 7, f is an overall focal length of the fisheye lens system 100, and f1 denotes a focal length of the first lens group G1.

Condition 7 defines a ratio of the focal length of the fisheye lens system 100 to the overall focal length of the first lens group G1. If the ratio is greater than an upper limit, it is impossible to ensure a sufficient back focal length (BFL). If the ratio is lower than a lower limit, it is difficult to compensate for aberration. When the fisheye lens system 100 is used in a closed-circuit television (CCTV), the fisheye lens system 100 requires a long BFL. In this case, if condition 7 is satisfied, the fisheye lens system 100 may have a sufficient BFL, and the fisheye lens system 100 of which aberration is easily compensated for may be embodied.

An aspheric surface described throughout this specification may be defined according to condition 8 below.

When an optical axis direction is an x-axis, and a direction perpendicular to the optical axis direction is a y-axis, an aspheric shape of a lens of the fisheye lens system 100 may be represented by condition 8 below, where a proceeding direction of a beam is positive. In condition 8, x denotes a distance from a peak of the lens in the optical axis direction, y denotes a distance from the x-axis in a direction perpendicular to the optical axis direction, k denotes a conic constant, A and B each denote an aspheric coefficient, and c denotes an inverse number (1/R) of a radius of curvature at the peak of the lens.

$$x = \frac{cy^2}{1 + \sqrt{1 - (k+1)c^2 y^2}} + Ay^4 \quad (8)$$

Design data of a lens system according to an exemplary embodiment will now be described.

Hereinafter, R denotes a radius of curvature, d denotes a thickness at a center of a lens or an interval between lenses, Nd denotes a refractive index with respect to a wavelength of d ray, and Vd denotes an Abbe number. In addition, f denotes the overall focal length of the fisheye lens system 100, BFL denotes a back focal length, Fno denotes an F-number, and θ is a maximum incident angle.

First Exemplary Embodiment

Table 1 below shows design data of the fisheye lens system 100 shown in FIG. 1. Table 2 below shows aspheric data of the fisheye lens system 100. In Table 1, S9 denotes a surface of the aperture ST, S17 and S18 denote two surfaces of the optical filter 9, and S19 denotes the image surface. f denotes the overall focal length of the fisheye lens system 100, BFL denotes a back focal length, Fno denotes an F-number, and θ denotes a maximum incident angle.

f=1.68
BFL=5.5
Fno=1.55
2θ=180°

TABLE 1

| Surface # | R | d | Nd | Vd |
|---|---|---|---|---|
| S1 | 12.9444 | 1 | 1.743299 | 49.22 |
| S2 | 4.75 | 2.812 | | |
| S3 | 289.0614 | 0.8 | 1.744001 | 44.899 |
| S4 | 4.8652 | 1.4782 | | |
| S5 | −18.2821 | 0.8 | 1.677902 | 55.518 |
| S6 | 7.7897 | 1.8876 | | |
| S7 | 23.7713 | 1.4 | 1.805184 | 25.046 |
| S8 | −10.5745 | 5.5064 | | |
| S9 | Infinity | 0.1 | | |
| S10 | 7.9602 | 1.5 | 1.487489 | 70.44 |
| S11 | −14.8669 | 0.7928 | | |
| S12 | 22.3286 | 2.2 | 1.620409 | 60.34 |
| S13 | −3.6 | 0.7 | 1.755199 | 27.53 |
| S14 | −189.1332 | 0.7378 | | |
| S15 | 12.3953 | 1.8 | 1.48463 | 69.8 |
| S16 | −5.1469 | 0.1 | | |
| S17 | Infinity | 2.25 | 1.516798 | 64.198 |
| Ss18 | Infinity | — | | |

TABLE 2

| Surface # | K | A |
|---|---|---|
| S15 | 0.0437 | −0.0031 |

Figure 2C:
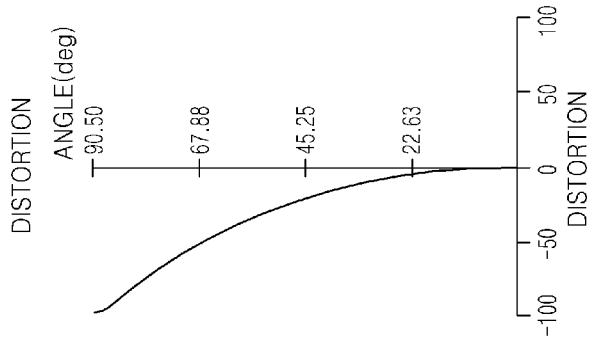
FIGS. 2A through 2C respectively show longitudinal spherical aberration, astigmatism, and distortion of the fisheye lens system of FIG. 1, according to an exemplary embodiment.
Figure 2B:
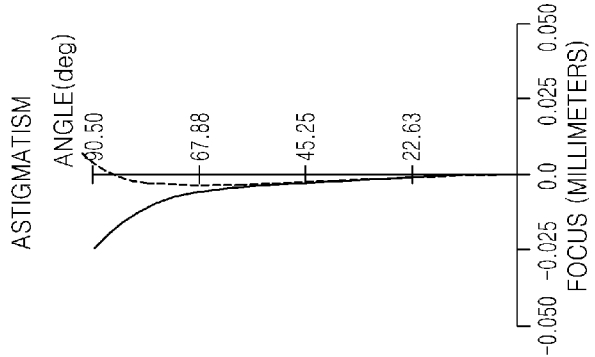
Figure 2A:
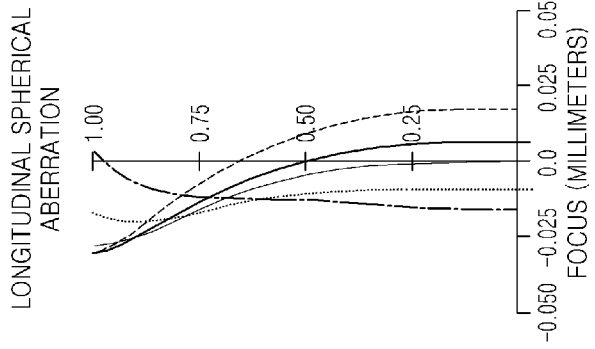
Figure 3A:
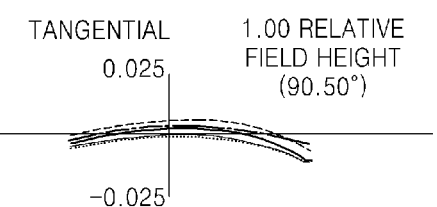
FIGS. 3A through 3E show coma of the fisheye lens system of FIG. 1, according to an exemplary embodiment.
Figure 3A:
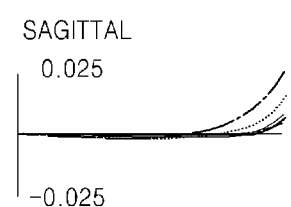
Figure 3B:
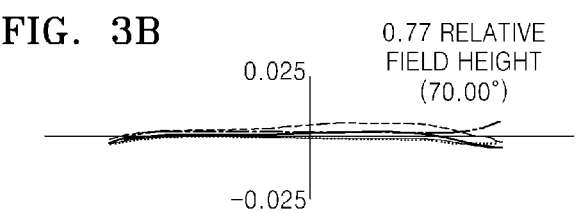
Figure 3B:
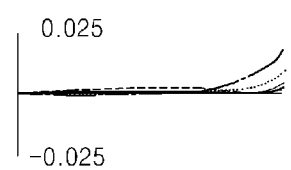
Figure 3C:
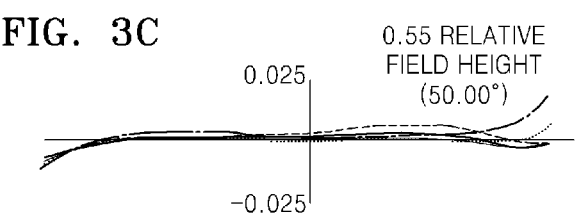
Figure 3C:
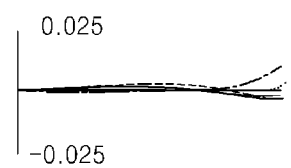
Figure 3D:
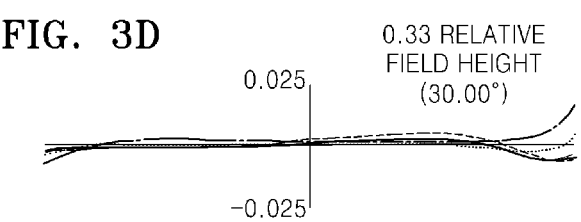
Figure 3D:
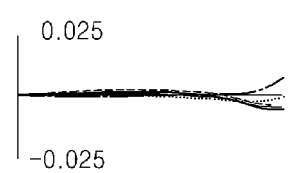
Figure 3E:
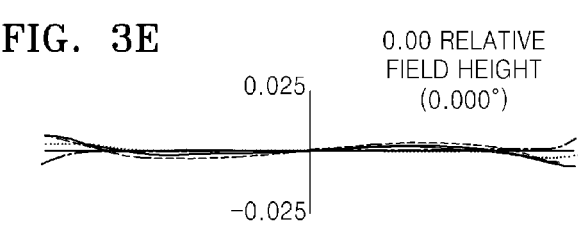
Figure 3E:
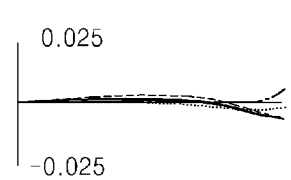

FIGS. 2A through 2C respectively show longitudinal spherical aberration, astigmatism, and distortion of the fisheye lens system 100 of FIG. 1. Referring to FIG. 2B regarding the astigmatism, in an astigmatic field curve, a solid line denotes tangential astigmatism, and a dotted line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion are shown with respect to light having a wavelength of about 546.07 nm.

FIGS. 3A through 3E show coma. In FIGS. 3A through 3E, left graphs show tangential coma, and right graphs show sagittal coma. Meanwhile, the coma is coma when incident angles of light incident on the fisheye lens system 100 are 90.50°, 70°, 50°, 30°, and 0°.

Second Exemplary Embodiment

Table 3 below shows design data of the fisheye lens system 100 shown in FIG. 4. Table 4 below shows aspheric data of the fisheye lens system 100. In Table 3, S9 denotes a surface of the aperture ST, and S17 and S18 denote two surfaces of the optical filter 9, and S19 denotes the image surface. f denotes the overall focal length of the fisheye lens system 100, BFL denotes a back focal length, Fno denotes an F-number, and θ denotes a maximum incident angle.

f=1.68
BFL=5.5
Fno=1.55
2θ=180°

TABLE 3

| Surface # | R | d | Nd | Vd |
|---|---|---|---|---|
| S1 | 15.6291 | 1 | 1.743299 | 49.22 |
| S2 | 5.0 | 2.1987 | | |

TABLE 3-continued

| Surface # | R | d | Nd | Vd |
|---|---|---|---|---|
| S3 | 19.1261 | 0.8 | 1.744001 | 44.899 |
| S4 | 4.9 | 1.7976 | | |
| S5 | −10.9346 | 0.8 | 1.677902 | 55.518 |
| S6 | 7.4575 | 1.9382 | | |
| S7 | 64.0638 | 1.4 | 1.805184 | 25.046 |
| S8 | −9.6034 | 6.5972 | | |
| S9 | Infinity | 0.1 | | |
| S10 | 8.086 | 1.55 | 1.487489 | 70.44 |
| S11 | −11.3877 | 1.3472 | | |
| S12 | 13.9851 | 2.3 | 1.516798 | 64.198 |
| S13 | −3.7 | 0.8 | 1.755199 | 27.53 |
| S14 | −93.1956 | 0.7359 | | |
| S15 | 16.9876 | 1.8 | 1.48463 | 69.8 |
| S16 | −4.7041 | 0.1 | | |
| S17 | Infinity | 2.25 | 1.516798 | 64.198 |
| S18 | Infinity | — | | |

TABLE 4

| Surface # | K | A |
|---|---|---|
| S15 | 0.0437 | −0.0031 |

Figure 4:
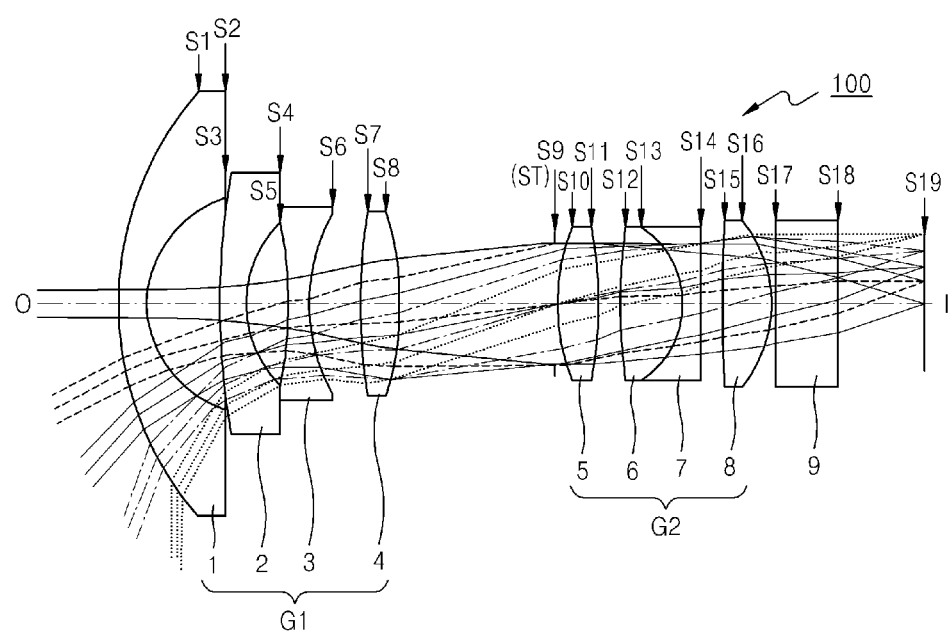
FIG. 4 is a diagram of a fisheye lens system according to another exemplary embodiment.
Figure 5C:
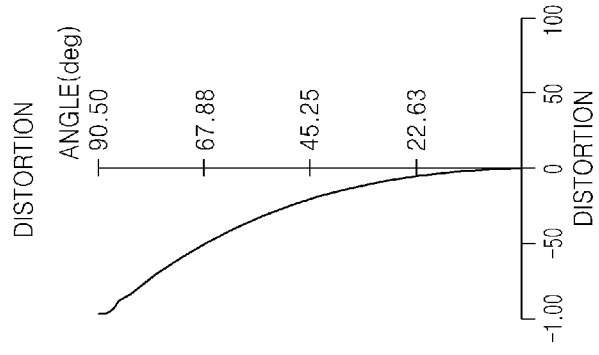
FIGS. 5A through 5C respectively show longitudinal spherical aberration, astigmatism, and distortion of the fisheye lens system of FIG. 4, according to an exemplary embodiment.
Figure 5B:
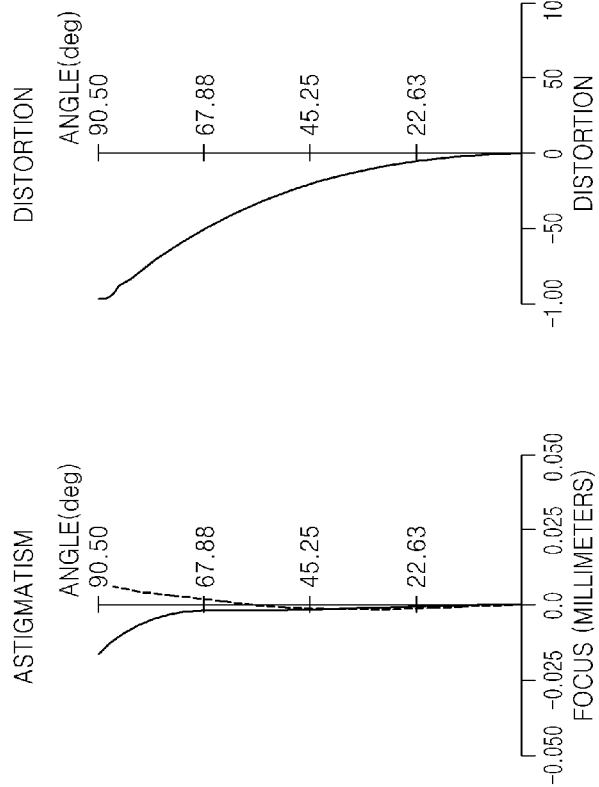
Figure 5A:
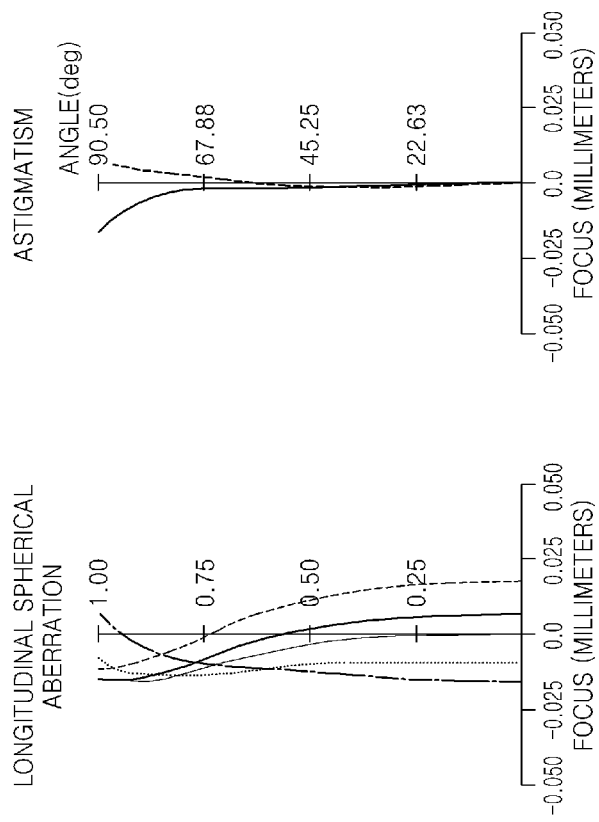
Figure 6A:
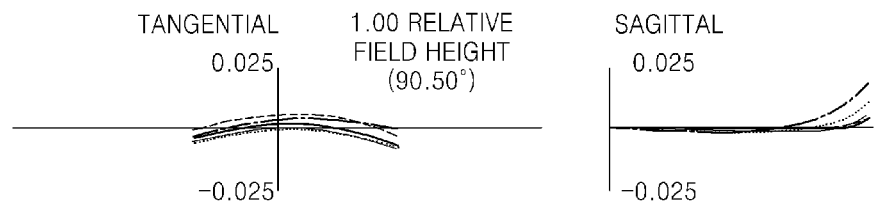
FIGS. 6A through 6E show coma of the fisheye lens system of FIG. 4, according to an exemplary embodiment.
Figure 6B:
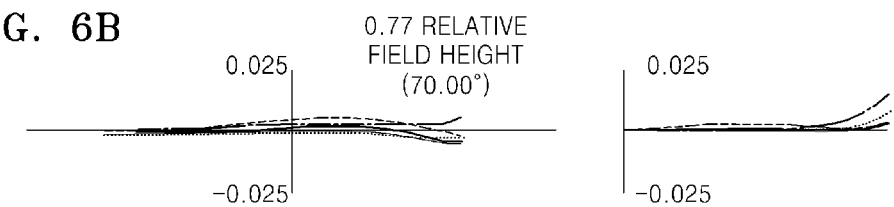
Figure 6C:
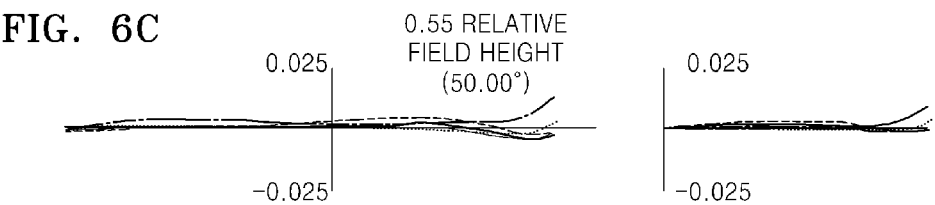
Figure 6D:
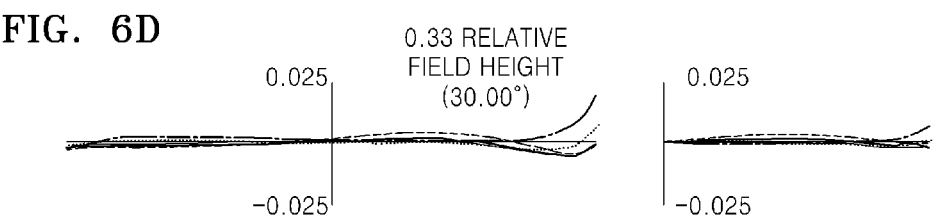
Figure 6E:
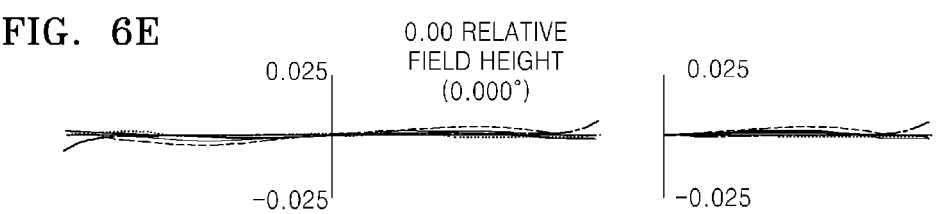

FIGS. 5A through 5C respectively show longitudinal spherical aberration, astigmatism, and distortion of the fisheye lens system 100 of FIG. 4. Referring to FIG. 5B regarding the astigmatism, in an astigmatic field curve, a solid line denotes tangential astigmatism, and a dotted line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion are shown with respect to light having a wavelength of about 546.07 nm.

FIGS. 6A through 6E show coma. In FIGS. 6A through 6E, left graphs show tangential coma, and right graphs show sagittal coma. Meanwhile, the coma is coma when incident angles of light incident on the fisheye lens system 100 are 90.50°, 70°, 50°, 30°, and 0°.

Third Exemplary Embodiment

Table 5 below shows design data of the fisheye lens system 100 shown in FIG. 7. Table 6 below shows aspheric data of the fisheye lens system 100. In Table 5, S9 denotes a surface of the aperture ST, S17 and S18 denote two surfaces of the optical filter 9, and S19 denotes the image surface. f denotes the overall focal length of the fisheye lens system 100, BFL denotes a back focal length, Fno denotes an F-number, and θ denotes a maximum incident angle.

f=1.68
BFL=5.5
Fno=1.55
2θ=180°

TABLE 5

| Surface # | R | d | Nd | Vd |
|---|---|---|---|---|
| S1 | 14.338 | 1 | 1.743299 | 49.22 |
| S2 | 5 | 2.3803 | | |
| S3 | 29.0593 | 0.8 | 1.744001 | 44.899 |
| S4 | 4.9 | 1.669 | | |
| S5 | −12.4829 | 0.8 | 1.677902 | 55.518 |
| S6 | 6.9413 | 2.1661 | | |
| S7 | 60.7519 | 1.4 | 1.805184 | 25.046 |
| S8 | −10.3199 | 5.3876 | | |
| S9 | Infinity | 0.2556 | | |
| S10 | 7.2503 | 1.55 | 1.487489 | 70.44 |
| S11 | −14.3391 | 1.9616 | | |
| S12 | 15.5 | 2.4 | 1.516798 | 64.198 |
| S13 | −3.7 | 0.8 | 1.755199 | 27.53 |
| S14 | −26.7642 | 0.3802 | | |
| S15 | 14.2869 | 2.0 | 1.48463 | 69.8 |
| S16 | −4.8561 | 0.1 | | |
| S17 | Infinity | 2.25 | 1.516798 | 64.198 |
| S18 | Infinity | — | | |

TABLE 6

| Surface # | K | A |
|---|---|---|
| S15 | 0.0437 | −0.0031 |

Figure 7:
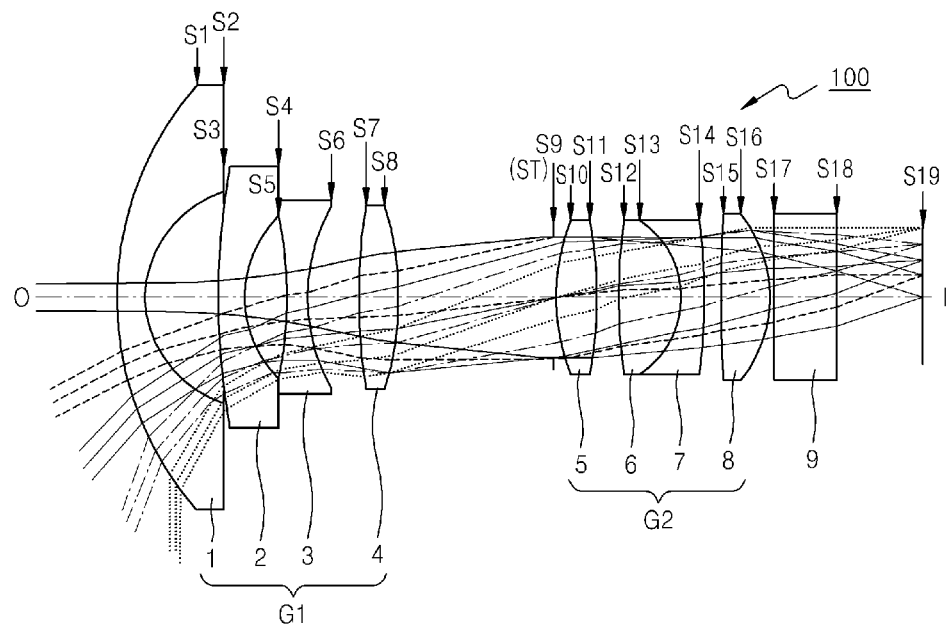
FIG. 7 is a diagram of a fisheye lens system according to another exemplary embodiment.
Figures 8A, 8B, 8C:
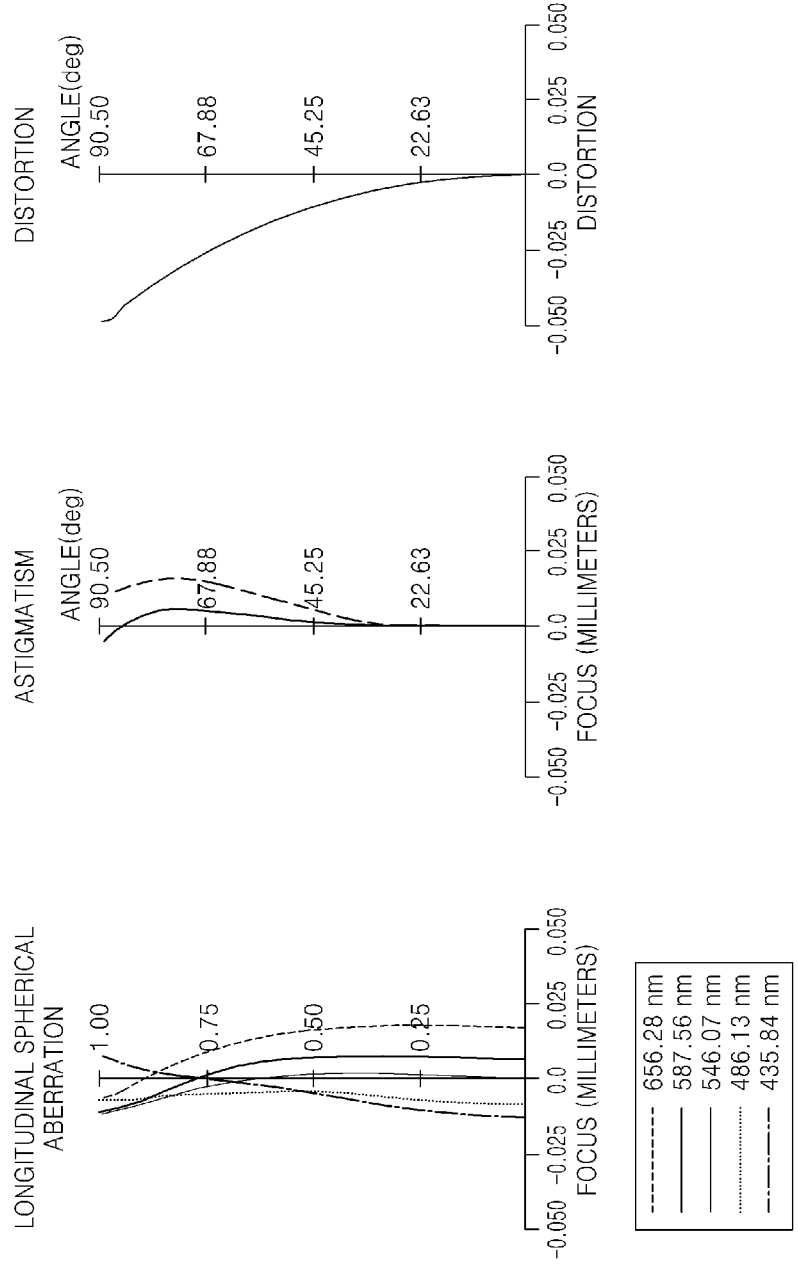
FIGS. 8A through 8C respectively show longitudinal spherical aberration, astigmatism, and distortion of the fisheye lens system of FIG. 7, according to an exemplary embodiment.
Figure 9A:
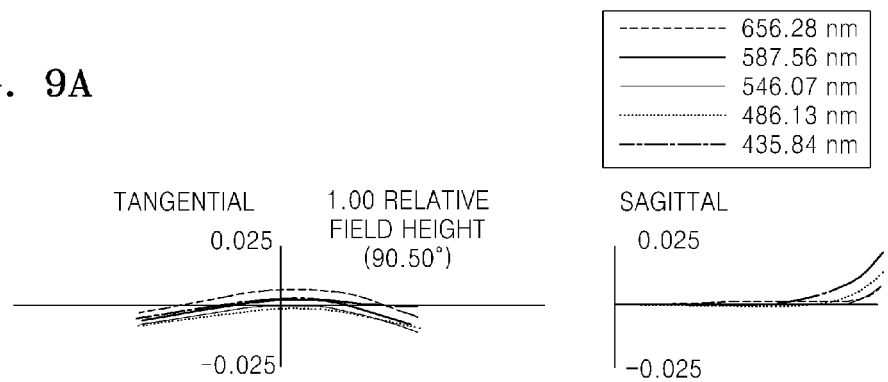
FIGS. 9A through 9E show coma of the fisheye lens system of FIG. 7, according to an exemplary embodiment.
Figure 9B:
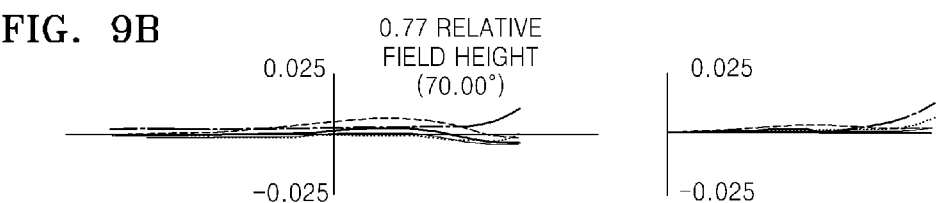
Figure 9C:
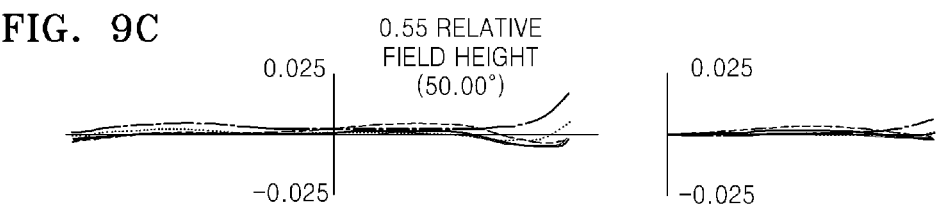
Figure 9D:
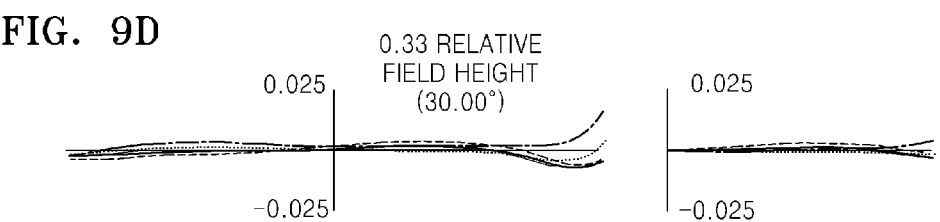
Figure 9E:
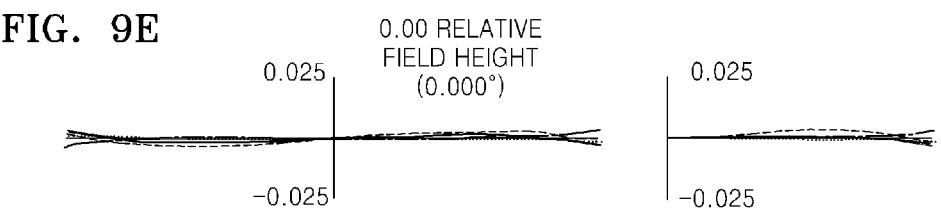

FIGS. 8A through 8C respectively show longitudinal spherical aberration, astigmatism, and distortion of the fisheye lens system 100 of FIG. 7. Referring to FIG. 8B regarding the astigmatism, in an astigmatic field curve, a solid line denotes tangential astigmatism, and a dotted line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion are shown with respect to light having a wavelength of about 546.07 nm.

FIGS. 9A through 9E show coma. In FIGS. 9A through 9E, left graphs show tangential coma, and right graphs show sagittal coma. Meanwhile, the coma is coma when incident angles of light incident on the fisheye lens system 100 are 90.50°, 70°, 50°, 30°, and 0°.

The fisheye lens system 100 according to exemplary embodiments may be miniaturized while having low manufacturing costs. In addition, the fisheye lens system 100 may be a bright lens system having an F-number of 1.55 while having a wide viewing angle and maintaining high resolution and peripheral illumination over an overall view.

The fisheye lens system 100 may be used in a photographing apparatus using a solid photographing device such as a charge-coupled device (CCD) or a complementary metal-oxide semiconductor (CMOS), such as a CCTV or a still camera.

Figure 10:
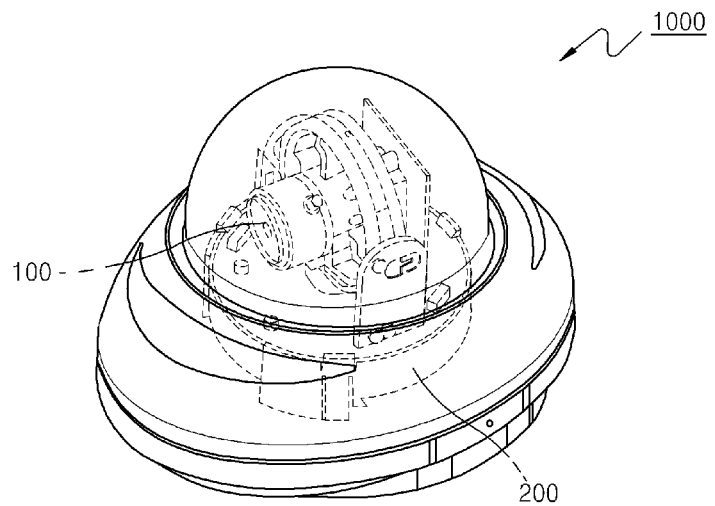
FIGS. 10 and 11 illustrate photographing apparatuses including a fisheye lens system, according to exemplary embodiments.
Figure 11:
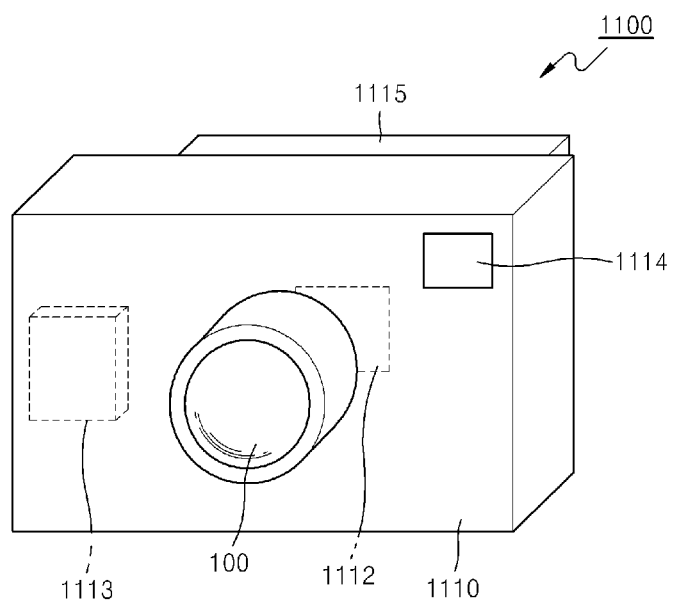

FIGS. 10 and 11 show photographing apparatuses 1000 and 1100 including the fisheye lens system 100. FIGS. 10 and 11 show a CCTV and a digital still camera including the fisheye lens system 100 described with reference to FIGS. 1 through 9, respectively.

Referring to FIG. 10, the photographing apparatus 1000 includes the fisheye lens system 100 and an imaging sensor 200 for converting light formed by the fisheye lens system 100 into an electrical image signal.

Information about an image of a subject, on which photoelectric transformation is performed by the imaging sensor 200, may be transmitted to a separate image processor (not shown) and may be output to a user using the photographing apparatus 1000, i.e., a CCTV.

Referring to FIG. 11, the photographing apparatus 1100 includes the fisheye lens system 100 and an imaging sensor 1112 for converting light focused by the fisheye lens system 100 into an electrical image signal. The photographing apparatus 1100 may include a recorder 1113 for recording information corresponding to an image of the subject, on which photoelectric transformation is performed by the imaging sensor 1112, and a view finder 1114 for seeing the image of the subject.

The photographing apparatus 1100 may include a display unit 1115 for displaying the image of the subject to the user. According to an exemplary embodiment, the view finder 1114 and the display unit 1115 are separately installed. Alternatively, the photographing apparatus 1100 may include the display unit 1115 only without a view finder.

According to the above exemplary embodiments, a bright fisheye lens system and a photographing apparatus may be miniaturized and may have high peripheral resolution as well as high central resolution.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A fisheye lens system comprising, in an order from an object to an image:
    a first lens group comprising at least three lenses and having negative refractive power;
    a second lens group having positive refractive power; and
    an aperture disposed between the first lens group and the second lens group,
    wherein the at least three lenses included in the first lens group comprise a first lens, a second lens, and a third lens, in the order from the object to the image, and satisfy conditions below:

$0.4 < SF1 < 0.6$;

$0.5 < SF2 < 1.0$; and $1.3 < SF3 < 5.5$, and wherein $SFi=(R1i-R2i)/(R1i+R2i)$ is a shaping factor of an $i^{th}$ lens (I=1, 2, or 3), $R1i$ is a radius of curvature of a surface of an object side of the $i^{th}$ lens, and $R2i$ is a radius of curvature of a surface of an image side of the $i^{th}$ lens, and
    wherein the second lens group comprises an aspheric lens.

2. The fisheye lens system of claim 1, wherein the first lens group satisfies a condition below:

$-0.4 < f/fl < -0.2$ wherein f denotes an overall focal length of the fisheye lens system, and fl denotes a focal length of the first lens group.

3. The fisheye lens system of claim 1, wherein the first lens group further comprises a fourth lens having positive refractive power.

4. The fisheye lens system of claim 1, wherein the second lens group comprises four lenses.

5. The fisheye lens system of claim 1, wherein the second lens group comprises a positive lens, a positive lens, a negative lens, and a positive lens.

6. The fisheye lens system of claim 1, wherein the second lens group comprises a cemented lens.

7. A photographing apparatus comprising:
    the fisheye lens system of claim 1; and
    an imaging sensor which converts light formed by the fisheye lens system into an electrical image signal.

8. The fisheye lens system of claim 1, wherein the first lens satisfies a condition below:

$1.3 < H1/2Y < 1.5$, wherein H1 denotes an effective radius of the surface of the object side of the first lens and 2Y denotes a diameter of an image circle.

9. The fisheye lens system of claim 8, wherein the first lens group satisfies a condition below:

$-0.4 < f/fl < -0.2$, wherein f denotes an overall focal length of the fisheye lens system, and fl denotes a focal length of the first lens group.

10. The fisheye lens system of claim 1, wherein each of the first lens, the second lens, and the third lens has negative refractive power.

11. The fisheye lens system of claim 10, wherein each of the first lens and the second lens is a meniscus lens having a surface convex toward the object.

12. The fisheye lens system of claim 1, wherein an interval D between the first lens group and the second lens group satisfies a condition below:

$0.3 < D/Ds < 0.5$, wherein Ds denotes a length between a lens surface that is closest to the object and a lens surface that is close to the image in the fisheye lens system.

13. The fisheye lens system of claim 12, wherein the first lens satisfies a condition below:

$1.3 < H1/2Y < 1.5$, wherein H1 denotes an effective radius of the surface of the object side of the first lens and 2Y denotes a diameter of an image circle.

14. The fisheye lens system of claim 13, wherein the first lens group satisfies a condition below:

$-0.4 < f/fl < -0.2$, wherein f denotes an overall focal length of the fisheye lens system, and fl denotes a focal length of the first lens group.

15. The fisheye lens system of claim 1, wherein an interval D between the first lens group and the second lens group satisfies a condition below:

$3.0 < D/f < 4.0$, wherein f denotes an overall focal length of the fisheye lens system.

16. The fisheye lens system of claim 15, wherein the interval D further satisfies a condition below:

$0.3 < D/Ds < 0.5$, wherein Ds denotes a length between a lens surface that is closest to the object and a lens surface that is close to the image in the fisheye lens system.

17. The fisheye lens system of claim 16, wherein the first lens satisfies a condition below:

$1.3 < H1/2Y < 1.5$, wherein H1 denotes an effective radius of the surface of the object side of the first lens and 2Y denotes a diameter of an image circle.

18. The fisheye lens system of claim 17, wherein the first lens group satisfies a condition below:

$-0.4 < f/fl < -0.2$, wherein f denotes an overall focal length of the fisheye lens system, and fl denotes a focal length of the first lens group.

* * * * *